US 9,182,159 B2
United States Patent
Hatada et al.

(10) Patent No.: US 9,182,159 B2
(45) Date of Patent: Nov. 10, 2015

(54) WATER HEATER AND CONTROL METHOD THEREFOR

(75) Inventors: Yasutaka Hatada, Fuji (JP); Kazuhiko Nakagawa, Fuji (JP); Katumi Naitoh, Fuji (JP)

(73) Assignee: PURPOSE COMPANY LIMITED, Fuji-shi (JP)

( * ) Notice: Subject to any disclaimer, the term of this patent is extended or adjusted under 35 U.S.C. 154(b) by 1306 days.

(21) Appl. No.: 12/904,262

(22) Filed: Oct. 14, 2010

(65) Prior Publication Data

US 2012/0090341 A1 Apr. 19, 2012

(51) Int. Cl.
*F24D 11/00* (2006.01)
*F25B 27/00* (2006.01)
*F24D 3/08* (2006.01)
*B01B 1/00* (2006.01)
*F24D 17/00* (2006.01)
*F24D 3/02* (2006.01)

(52) U.S. Cl.
CPC . *F25B 27/00* (2013.01); *F24D 3/08* (2013.01); *B01B 1/00* (2013.01)

(58) Field of Classification Search
CPC ......... B01B 1/00; F24D 3/08; F24D 17/0026; F24D 17/0034; F24D 17/02; F24D 19/1051; F24D 3/02; F24D 3/087; F24H 1/0072; F24H 1/08; F24H 1/107; F24H 1/10; F24H 4/02; F24H 8/003
USPC ...... 237/8 A, 8 C, 12, 2 A, 19, 57, 59, 62, 63, 237/81; 122/31.1, 32, 15.1, 18.1; 236/20 R, 236/25 R
See application file for complete search history.

(56) References Cited

U.S. PATENT DOCUMENTS

| | | | | | |
|---|---|---|---|---|---|
| 2,005,852 | A | * | 6/1935 | Broderick | 237/8 R |
| 2,520,446 | A | * | 8/1950 | Thrush | 236/12.14 |
| 4,142,515 | A | * | 3/1979 | Skaats | 122/13.3 |
| 4,358,652 | A | * | 11/1982 | Kaarup | 219/688 |
| 4,360,003 | A | * | 11/1982 | Hardy | 126/367.1 |
| 5,255,338 | A | * | 10/1993 | Robinson et al. | 392/451 |
| 5,692,676 | A | * | 12/1997 | Walker | 237/8 R |
| 5,730,356 | A | * | 3/1998 | Mongan | 237/19 |
| 5,829,475 | A | * | 11/1998 | Acker | 137/337 |
| 6,220,520 | B1 | * | 4/2001 | Gibbs | 237/8 R |

(Continued)

FOREIGN PATENT DOCUMENTS

JP 61116236 A * 6/1986 ............... F24H 1/10
JP 63-123915 U 8/1988

(Continued)

*Primary Examiner* — Gregory Huson
*Assistant Examiner* — Daniel E Namay
(74) *Attorney, Agent, or Firm* — Westerman, Hattori, Daniels & Adrian, LLP

(57) ABSTRACT

A water heater includes one or a plurality of heat pumps that heat tap water or return water from a hot water supply part, a circulation line that supplies hot water heated in the heat pumps to the hot water supply part, and introduces the return water from the hot water supply part to the heat pumps, an incoming water pipe that joins to between the hot water supply part in the circulation line and the heat pumps and supplies the tap water, a circulation pump that returns the return water to the heat pumps and circulates the return water through the circulation line, and a control unit that controls operation or stop of the circulation pump according to driving operation time or elapsed stop time by linking a combustion process of the heat pumps.

11 Claims, 13 Drawing Sheets

(56) References Cited

U.S. PATENT DOCUMENTS

| | | | |
|---|---|---|---|
| 6,591,901 B2 * | 7/2003 | Bujak, Jr. | 165/209 |
| 6,647,302 B2 * | 11/2003 | Pouchak | 700/83 |
| 6,874,694 B2 * | 4/2005 | Saitoh et al. | 237/2 B |
| 7,234,646 B2 * | 6/2007 | Saitoh et al. | 237/2 B |
| 7,322,532 B2 * | 1/2008 | Takada et al. | 236/11 |
| 7,520,445 B2 * | 4/2009 | Feinleib et al. | 236/94 |
| 7,597,066 B2 * | 10/2009 | Shimada et al. | 122/18.1 |
| 7,658,335 B2 * | 2/2010 | Johnson, Jr. | 237/8 R |
| 8,172,157 B2 * | 5/2012 | Nakagawa et al. | 237/12.1 |
| 8,210,132 B2 * | 7/2012 | Asakura et al. | 122/18.1 |
| 2004/0031858 A1 * | 2/2004 | Haklander et al. | 237/2 A |
| 2004/0144528 A1 * | 7/2004 | Kunimoto et al. | 165/298 |
| 2004/0200905 A1 * | 10/2004 | Saitoh et al. | 237/19 |
| 2005/0001046 A1 * | 1/2005 | Laing | 237/19 |
| 2005/0006402 A1 * | 1/2005 | Acker | 222/63 |
| 2005/0022871 A1 * | 2/2005 | Acker | 137/337 |
| 2005/0139690 A1 * | 6/2005 | Wilnechenko et al. | 237/12 |
| 2005/0161521 A1 * | 7/2005 | Guyer | 237/12.1 |
| 2006/0027673 A1 * | 2/2006 | Fabrizio | 237/2 A |
| 2007/0257122 A1 * | 11/2007 | Shimada et al. | 237/12 |
| 2008/0179416 A1 * | 7/2008 | Johnson et al. | 237/8 A |
| 2008/0223451 A1 * | 9/2008 | Acker | 137/337 |
| 2009/0277203 A1 * | 11/2009 | Dupraz | 62/238.7 |
| 2010/0025488 A1 * | 2/2010 | Park et al. | 237/2 B |
| 2011/0017152 A1 * | 1/2011 | Min | 122/19.1 |
| 2012/0138149 A1 * | 6/2012 | Hatada et al. | 137/1 |
| 2014/0262809 A1 * | 9/2014 | Stegarev et al. | 205/412 |
| 2015/0148971 A1 * | 5/2015 | Acker | 700/282 |

FOREIGN PATENT DOCUMENTS

| | | | | |
|---|---|---|---|---|
| JP | 63-207948 A | | 8/1988 | |
| JP | 01277139 A | * | 11/1989 | F24D 17/00 |
| JP | 03102136 A | * | 4/1991 | F24H 1/00 |
| JP | 03177715 A | * | 8/1991 | F24D 3/00 |
| JP | 06257770 A | * | 9/1994 | F24D 3/08 |

* cited by examiner

WATER HEATER AND CONTROL METHOD THEREFOR

BACKGROUND OF THE INVENTION

1. Field of the Invention

The present invention relates to a water heater in which a circulation line is provided in a water heating part for circulating hot water, and in which operation of a heat pump and a circulation pump is controlled according to temperature of the circulated hot water, elapsed time, etc.

2. Description of the Related Art

Conventionally, there is a water heater in which a pump is individually disposed in a hot water supply pipe and hot water is circulated therein. Thus, hot water of desired temperature is available instantaneously. In a case of such circulation, the pump is turned ON/OFF by a switch including a temperature sensor so as to supply hot water at prescribed setting temperature, for example, the switch is provided with a thermostat or a timer.

A controller for pump control is on the market. This controller detects temperature on a pipe or water temperature in the pipe by, for example, being attached to the pipe and stops combustion in a heat pump.

If the above controller is not disposed in the structure of circulating hot water, the endurance of a water heater may be decreased because, for example, a pump operates continuously.

It is known as such a water heater in which hot water is circulated in a circulation line that a circulation pump and a heater are provided in a circulation line and operation of the circulation pump and the heater is stopped according to the rise in temperature of the circulated hot water (for example, Japanese Laid-open Utility Model Publication No. 63-123915).

It is also known that a sensor detecting the minimum temperature is provided in a circuit and when detected temperature goes down to the freezing temperature, a pump and heating means are operated (for example, Japanese Laid-open Patent Publication No. 63-207948.)

Components other than a heat pump, such as a tank and a temperature detector, or a controller that controls these components are required to be disposed for making an instantaneous water heating unit so that heated hot water is available instantaneously as soon as a hot water supply operation is performed. This disposition complicates the structure of a water heater.

When the outside air is low temperature, hot water is circulated in a circulation line so as not to freeze the circulation line. There is a problem that the structure of a water heater is complicated because individual control means is provided for a planned circulation process.

Concerning such problems, there is no disclosure or suggestion thereof in Japanese Laid-open Utility Model Publication No. 63-123915 and Japanese Laid-open Patent Publication No. 63-207948, and no disclosure or suggestion about the structure etc. for solving them is presented.

SUMMARY OF THE INVENTION

An object of the present invention relates to a water heater in which hot water is circulated in a circulation line to be supplied, and is to achieve a simple control structure.

Another object of the present invention relates to a water heater in which a plurality of heat pumps are provided, and is to perform water heating control with a simple structure.

To achieve the above objects, a water heater of the present invention include (a) heat pump (s), a circulation line, an incoming water pipe, a circulation pump and a control unit. The heat pump(s) are one or a plurality of heat pumps that heat tap water or return water from a hot water supply part. The circulation line supplies hot water heated in the heat pumps to the hot water supply part, and introduces the return water from the hot water supply part to the heat pumps. The incoming water pipe joins to between the hot water supply part in the circulation line and the heat pumps, and supplies the tap water. The circulation pump returns the return water to the heat pumps, and circulates the return water through the circulation line. The control unit controls operation or stop of the circulation pump according to driving operation time or elapsed stop time by linking a combustion process of the heat pumps. According to such structure, the objects of the present invention can be achieved.

The water heater of the present invention may preferably include temperature detection means and flow rate detection means. The temperature detection means detects temperature of the tap water and/or the return water at an inlet part of the heat pumps. The flow rate detection means detects flow rates of the tap water and/or the return water for the heat pumps in the circulation line. The control unit calculates required quantity of heat based on an incoming flow rate for the heat pumps and temperature detected by the temperature detection means, stops combustion of the heat pumps based on the required quantity of heat, and stops the circulation pump.

In the water heater of the present invention, preferably, the control unit may cause the circulation pump to operate when the flow rate in the circulation line is a predetermined value or over, when a certain time has passed or when the required quantity of heat of the tap water and/or the return water is a predetermined value or over, during the stop of the circulation pump.

In the water heater of the present invention, preferably, the circulation line may include branch means, a hot water supply pipe and a return pipe. The branch means joins the tap water from the incoming water pipe. The hot water supply pipe supplies hot water from the heat pumps to the hot water supply part. The return pipe returns the return water from the hot water supply part to the heat pumps. The circulation pump is disposed on the return pipe.

In the water heater of the present invention, preferably, back flow prevention means that prevents a back flow of the tap water or the return water may be provided on the incoming water pipe and the return pipe.

In the water heater of the present invention, preferably, the control unit may cause the circulation pump to operate for a predetermined time when a stop state of the circulation pump is kept for setting time, and causes the circulation pump to move to freezing prevention operation when hot water temperature in the circulation line is predetermined value or below.

In the water heater of the present invention, preferably, the control unit may include a control switch for controlling operation for the circulation pump, and causes the circulation pump to execute the freezing prevention operation according to setting of the control switch.

To achieve the above objects, a control method for a water heater of the present invention includes heating, supplying return water, supplying tap water, circulating and controlling. The heating is heating tap water or heating return water from a hot water supply part in one or a plurality of heat pumps. The supplying return water is supplying hot water heated in the heat pumps to the hot water supply part, and introducing the return water from the hot water supply part to the heat pumps via a circulation line. The supplying tap water is supplying the tap water by joining the tap water between the hot water supply part in the circulation line and the heat pumps. The circulating is returning the return water to the heat pumps, and circulating the return water in the circulation line by a circulation pump. The controlling is controlling operation or stop of the circulation pump according to driving operation time or elapsed stop time by linking a combustion process of the heat pumps. According to such structure, the above objects can be achieved.

The control method of water heating of the present invention may preferably include detecting water temperature, detecting flow rate and controlling. The detecting water temperature is detecting temperature of the tap water and/or the return water at an inlet part of the heat pumps. The detecting flow rate is detecting flow rates of the tap water and/or the return water for the heat pumps in the circulation line. The controlling is calculating required quantity of heat based on an incoming flow rate for the heat pumps and the detected temperature, stopping combustion of the heat pumps based on the required quantity of heat, and stopping the circulation pump.

The control method of water heating of the present invention may preferably include operating the circulation pump when the flow rate in the circulation line is a predetermined value or over, when a certain time has passed or when the required quantity of heat of the tap water and/or the return water is a predetermined value or over, during the stop of the circulation pump.

The control method of water heating of the present invention may preferably include operating the circulation pump for a predetermined time when a stop state of the circulation pump is kept for setting time, and moving the circulation pump to freezing prevention operation when hot water temperature in the circulation line is a predetermined value or below.

Any of the following effects can be obtained according to the above described water heater or a control method therefor of the present invention.

(1) Operation of a water heater, including a circulation pump for circulating heated hot water can be controlled by a control unit common to, for example, a combustion part. Thus, structure of the control unit can be simplified.

(2) Operation control of a circulation pump etc. is linked with combustion control of a combustion part in water heating operation, thermal operation, monitoring for protection against freezing, etc. Thus, a common control unit can be used, and structure of the water heater can be simplified. The improvement of the operability for the control unit can also be achieved.

(3) The efficiency of thermal control can be achieved by linking operation control of a combustion part and a circulation pump according to setting temperature. Running costs can also be saved.

(4) A heat pump, a circulation pipe, etc. can be prevented from being frozen by a simple control structure, and damage to a device, etc. can also be prevented.

Other objects, features and advantages of the present invention will be more clearly understood by referring to attached drawings and each of embodiments.

DESCRIPTION OF THE PREFERRED EMBODIMENTS

First Embodiment

Figure 1:
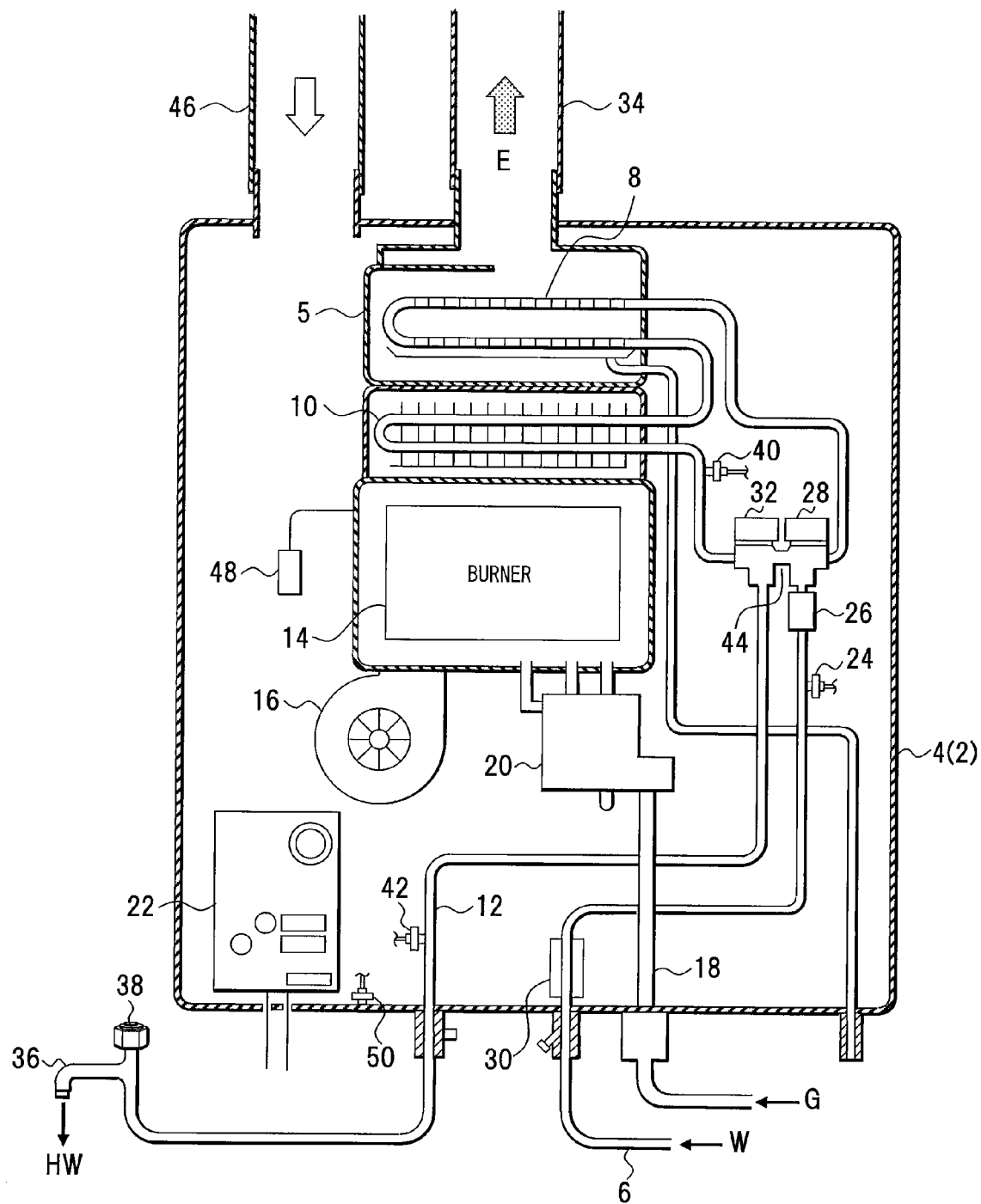
FIG. 1 depicts an example of structure of a heat pump in a water heater according to a first embodiment.
Figure 2:
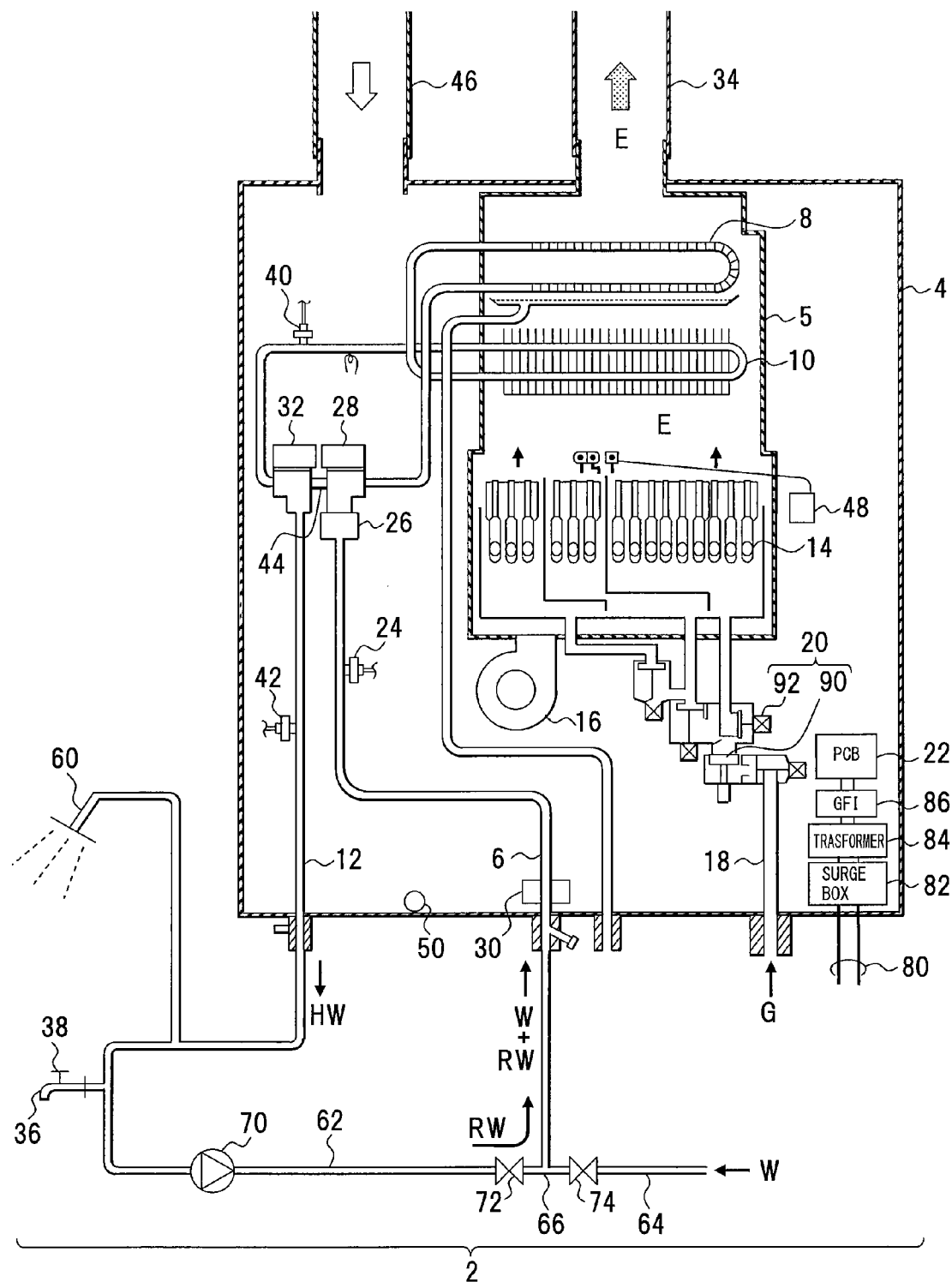
FIG. 2 depicts an example of structure of a water heater in which a circulation line is provided.
Figure 3:
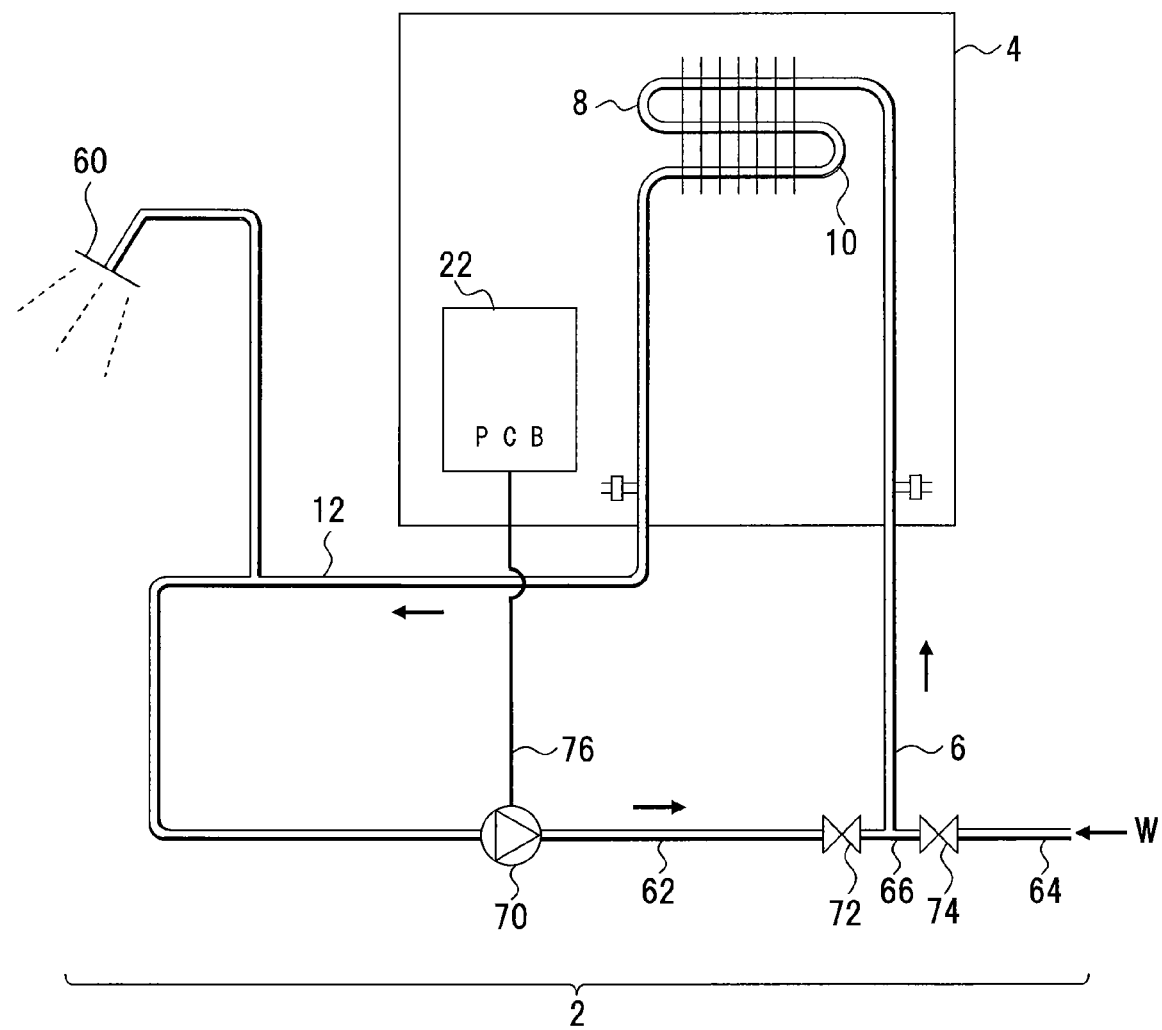
FIG. 3 depicts an example of connection between a circulation pump and a control unit.
Figure 4:
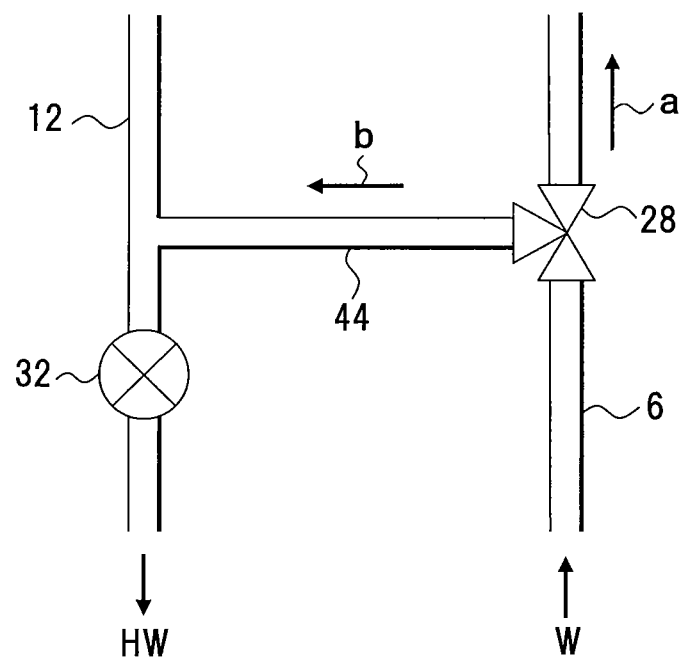
FIG. 4 depicts an example of structure of a bypass pipe.

A first embodiment will be described with reference to FIGS. 1 to 4. FIG. 1 depicts an example of structure of a heat pump in a water heater according to the first embodiment, FIG. 2 depicts an example of structure of the water heater, FIG. 3 depicts an example of connection between a circulation pump and a control unit, and FIG. 4 depicts an example of structure of a bypass pipe. Each structure depicted in FIGS. 1 to 4 is an example, and thus the present invention is not limited to such a structure.

This combustion device 4 is an example of a heat pump of a water heater 2 of the present invention, and is means for heating, for example, tap water W, which is supplied from an inlet of the combustion device 4, by exchanging its heat for exhaust E, which is generated by combustion of fuel gas G etc., and supplying hot water HW. The combustion device 4 includes, as depicted in FIG. 1, a water supply pipe 6 that introduces the tap water W into the combustion device 4, a secondary heat exchanger 8, a primary heat exchanger 10 and a hot water outgoing pipe 12. The combustion device 4 also includes a burner 14 and a fan motor 16 in a combustion chamber 5. The combustion device 4 further includes a gas supply line 18, a gas adjustment valve 20 and a PCB (Printed Circuit Board) 22 as a controller.

The water supply pipe 6 is an example of water supply means for the water heater 2 and the combustion device 4, and, for example, introduces the tap water W from a water pipe and introduces returned water RW circulated in the water heater (FIG. 2). The water supply pipe 6 includes, for example, a water temperature sensor 24 and a flow rate sensor 26. The water supply pipe 6 also includes a bypass valve 28 and a heater 30.

The water temperature sensor 24 is an example of means for detecting temperature of the tap water W which is supplied to the combustion device 4 and temperature of the return water RW (FIG. 2). In water heating control, temperature detected by the water temperature sensor 24 is used as, for example, return temperature (QIN), the required quantity of heat is calculated, and the combustion of the burner 14 is determined.

The flow rate sensor 26 is an example of means for detecting water supplied to the combustion device 4 and detecting the flaw rates of the supplied tap water W and the return water RW (FIG. 2). Opening control of the bypass valve 28 etc. are performed using the flow rates detected by the flow rate sensor 26.

The bypass valve 28 is an example of means for distributing the supplied tap water W to the secondary heat exchanger 8 and the hot water outgoing pipe 12. The opening of the bypass valve 28 is controlled based on, for example, required water heating temperature and the required volume of hot water. The bypass valve 28 introduces a part of the tap water W of low temperature and a part of the return water RW to the hot water outgoing pipe 12 by bypassing the heat exchangers 8 and 10. The tap water W and the return water RW which the bypass valve 28 makes flow join the heated hot water HW, for example, around a water control valve 32 of the hot water outgoing pipe 12.

The secondary heat exchanger 8 is an example of heat exchange means for exchanging heat of the supplied tap water W for mainly latent heat of the exhaust E generated by the burner 14.

The primary heat exchanger 10 is an example of heat exchange means for exchanging heat of the supplied tap water W for mainly sensible heat of the exhaust E generated by the burner 14. In the combustion device 4, the secondary heat exchanger 8 is disposed upstream of the water supply pipe 6, and the primary heat exchanger 10 is disposed downstream of the water supply pipe 6 in order to increase heat absorption efficiency and to lower heat rejection temperature from a vent 34 as to the exhaust E.

The hot water outgoing pipe 12 is an example of water heating means for introducing the hot water HW heated in the heat exchangers 8 and 10 to a hot water supply part, and, for example, includes a hot water outlet 36 and a hot water faucet 38 at its end. The hot water outgoing pipe 12 includes, for example, a temperature sensor 40 detecting temperature of the hot water HW just after heat exchange and a hot water temperature sensor 42 detecting temperature of the hot water HW in a hot water supply part. The hot water outgoing pipe 12 also includes the above described water control valve 32.

As one example, a thermistor thermometer may be used for the water temperature sensor 24, the hot water temperature sensor 42 and other temperature detection means depicted therein. Detected temperature information may be informed of the PCB 22.

The water control valve 32 is an example of means for controlling the flow rate of outgoing hot water from the combustion device 4. As described above, the water control valve 32 controls the flow rate of the hot water HW that is adjusted to required temperature by mixing the hot water HW of high temperature, heated in the heat exchangers 8 and 10, with the tap water W of low temperature, separated at the bypass valve 28, through a bypass pipe 44. Therefore, the volume of supplied water for the water supply pipe 6 and the combustion of the burner 14 are controlled according to, for example, the opening of the water control valve 32. The openings of the water control valve 32 and the bypass valve 28 may be controlled by the comparison of temperature detected by the hot water temperature sensor 42 with setting temperature.

The burner 14 is an example of combustion means, and combusts, for example, the fuel gas G supplied from the gas supply line 18 to generate the exhaust E. The fan motor 16, which is intake means, is disposed in the burner 14, and air necessary for a combustion process is supplied. The fan motor 16 is disposed, for example, around the burner 14, and is means for introducing the air, which is taken in from an intake pipe 46 disposed on the combustion device 4, to the burner 14.

The gas supply line 18 is an example of supply means of the fuel gas G to the burner 14, and provides the gas adjustment valve 20. Combustion of the burner 14 can be controlled by controlling the opening of the gas adjustment valve 20.

In addition, the burner 14 includes an igniter 48 that is an ignition means for the burner 14 and flame detection means.

The PCB 22 constituting a control device of the combustion device 4 is also provided. The PCB 22 may be connected to a remote controller. An input operation of setting outgoing hot water temperature can be performed using the remote controller.

A heater 30 and a low temperature detection sensor 50 may be provided on the water supply pipe 6. The heater 30 is an example of means for preventing supplied water from being frozen, and the low temperature detection sensor 50 detects outside air temperature etc. When the low temperature detection sensor 50 detects, for example, 4° C., the heater 30 is operated and the water supply pipe 6 etc. are heated in order to prevent functional components from being frozen due to the outside air of low temperature.

In such a structure, it makes the tap water W etc. flow into the water supply pipe 6 to open the hot water faucet 38 on the hot water outgoing pipe 12. Temperature and the flow rate of the tap water W etc., flowing into the water supply pipe 6, are detected by the water temperature sensor 24 and the flow rate sensor 26, respectively. Detected information thereby is transmitted to the PCB 22. Thus, the burner 14 is ignited and the exhaust E is generated. Sensible heat of the exhaust E of high temperature is absorbed in the primary heat exchanger 10. Latent heat thereof is absorbed in the secondary heat exchanger 8. Thus, heat exchange is executed with the tap water W and exhaust is discharged from the vent 34.

Concerning the heated hot water HW, temperature detected by the hot water temperature sensor 42 is compared with setting temperature set in a remote controller disposed in the PCB 22. If the temperature is different, temperature of outgoing hot water is adjusted by, for example, adjusting the flow rate by the water control valve 32 or by controlling the combustion of the burner 14 by the gas adjustment valve 20.

In the water heater 2 providing the combustion device 4, as depicted in FIG. 2, water heating means such as the hot water outlet 36 and a showerhead 60 is disposed for the hot water outgoing pipe 12. The water heater 2 also includes a circulation line 62 that connects the hot water outgoing pipe 12 to the water supply pipe 6 of the combustion device 4.

The circulation line 62 is an example of means for circulating the outgoing hot water HW through the water supply part and keeping the heat of the outgoing hot water HW. The circulation line 62 uses the hot water HW, which was not used, by returning the hot water HW to the water supply pipe 6 again. The hot water HW, returned to the water supply pipe 6 and circulated, is mixed with the tap water W as the return water RW, and is heated in the combustion device 4 again. The circulation line 62, for example, joins a tap water pipe 64 which supplies the tap water W, and is connected to the water supply pipe 6. The circulation line 62, the tap water pipe 64 and the water supply pipe 6 connect to each other at a branch 66 using, for example, branch furniture, and make the tap water W join to the return water RW and flow into the water supply pipe 6.

The circulation line 62 provides a circulation pump 70. The circulation line 62 also provides a check valve 72 just before a joint of the water supply pipe 6 and the tap water pipe 64.

The circulation pump 70 is an example of means for pumping the return water RW in the circulation line 62 to the water supply pipe 6. Driving the circulation pump 70 makes the return water RW flow into the water supply pipe 6 in the combustion device 4 against the pressure of the supplied tap water W. The circulation pump 70 provides, for example, an electromagnetic switch, and as depicted in FIG. 3, a signal line 76 is connected to the PCB 22 in the combustion device 4. Thereby, the control of the circulation pump 70 can be linked with the control of the combustion device 4. Next operation or stop of the circulation pump 70 is controlled according to, for example, the latest driving operation time or elapsed stop time of the combustion device 4 or the circulation pump 70.

The connection of the circulation pump 70 and the PCB 22 in the combustion device 4 is not limited to wired connection using the signal line 76. Wireless communication may transmit and receive a control signal.

The check valve 72 is an example of backflow prevention means from the water supply pipe 6 or the tap water pipe 64 to the circulation line 62. A check valve 74 is also disposed in the tap water pipe 64. Water pressure applied to the tap water W and water pressure by the circulation pump 70 make the tap water W and the return water RW flow into the water supply pipe 6 with prevention against the backflow in the circulation line 62 and the tap water pipe 64, joining to each other at the branch 66. That is, if the hot water HW is consumed at the hot water outlet 36 or the showerhead 60, the tap water W of low temperature is supplied from the tap water pipe 64 and the return water RW which is hot water is mixed to be allowed to flow into the water supply pipe 6.

An electric supply line 80 is connected to the PCB 22 of the combustion device 4 as depicted in FIG. 2. Supplied AC current is inputted to the PCB 22 via a surge box 82, a transformer 84 and a GFI 86. The surge box 82 is, for example, means for absorbing a surge from an AC source. The transformer 84 is means for changing a voltage of an AC source to a predetermined voltage.

As depicted in FIGS. 1 and 2, the above bypass valve 28 makes water of low temperature, which is allowed to be flow through the bypass pipe 44, flow toward the water control valve 32. The invention is not limited thereto. For example, as depicted in FIG. 4, supplied water b of low temperature which the bypass valve 28 makes flow toward the bypass pipe 44 may be joined to the hot water outgoing pipe 12 upstream from the water control valve 32. That is, opening and closing control of the water control valve 32 determines the flow rate of supplied water which is allowed to flow into the water supply pipe 6. Such control may be performed that supplied water a is allowed to flow into the heat exchangers 8 and 10 and the supplied water b is allowed to flow into the bypass pipe 44 according to setting outgoing water temperature.

The gas adjustment valve 20 for the burner 14 includes, for example, a gas proportional valve 90 for controlling the supply of the fuel gas G according to its opening (FIG. 2) and a gas solenoid valve 92 for supplying or blocking the fuel gas G according to its opening or closing.

Thermal control of the water heater 2 may be performed by a following process.

When the hot water HW from the showerhead 60 or the hot water outlet 36 is used, the combustion device 4 is started to operate. The water temperature sensor 24 detects temperature of the incoming tap water W and return water RW. The flow rate sensor 26 detects the flow rate of supplied water. The hot water temperature sensor 42 monitors temperature of the hot water HW so that outgoing hot water temperature becomes setting temperature, and combustion and the flow rate of supplied hot water are adjusted.

After a predetermined time has passed since the use of supplied hot water had been ended, required "gou" representing the water heating capacity for the thermal process is calculated using setting outgoing hot water temperature, temperature detected by the water temperature sensor 24 (return temperature), the flow rate stored when the circulation pump 70 was previously used, etc. If required "gou" is, for example, 2.5 or over and temperature detected by the water temperature sensor 24 is lower than that of the latest combustion operation by 3° C. or over, the circulation pump 70 is started to operate. When the flow rate sensor 26 detects the water flow of a predetermined rate or over, the burner 14 is started to combust. Required "gou" is calculated using detected values by the water temperature sensor 24, the hot water temperature sensor 42 and the flow rate sensor 26. If 90 seconds have passed since "gou" had been under 2.5, the combustion is stopped.

Here, "gou" will be described. The above described "gou" (Japanese) is a value representing the water heating capacity of the water heater 2. 1 (gou) is the capacity that the temperature of water W of 1 (L) is raised by 25 (° C.) a minute. The capacity an hour is described as $$1\ (gou) = 1\ (\text{L/min}) \times 1\ (\text{kcal/L} \cdot °\text{C.}) \times 25(°\text{C.}) \times 60\ (\text{min/h}) \quad (1)$$
$$= 1,5000\ (\text{kcal/h})$$

That is, the formula (1) represents that the combustion and the flow rate are increased or decreased in proportion to "gou".

The water heating capacity represented by 1 (gou) will be represented by a U.S. formula. As represented below, since $$1\ (kcal/h) = 3.968\ (BTU/h),$$

$$1,500\ (kcal/h) = 5,952\ (BTU/h) = 1\ (gou) \quad (2)$$

Thereby, with reference to the formula (1), "gou" is determined by the deference between supplied water temperature and outgoing hot water temperature, and the flow rate.

In the water heater 2, the circulation pump 70 is driven based on temperature detected by the water temperature sensor 24, hot water is circulated in the hot water outgoing pipe 12 and the circulation line 62, and freezing prevention operation in pipes is performed. Thereby, freezing prevention can be achieved for the hot water outgoing pipe 12 to the hot water outlet 36, the showerhead 60 and the circulation pump 70, and the circulation line 62 for the return water RW in the water heater 2, for example, at night in winter or disposed at a region of severe winter.

According to such a structure, operation of a water heater, including a circulation pump for circulating heated hot water can be controlled by a control unit common to, for example, a combustion part. Thus, structure of the control unit can be simplified. The efficiency of thermal control can be achieved by linking operation control of a combustion part and a circulation pump according to setting temperature. Running costs can also be saved.

Second Embodiment

A second embodiment represents an example of structure of a water heater in which a plurality of combustion devices are disposed.

Figure 5:
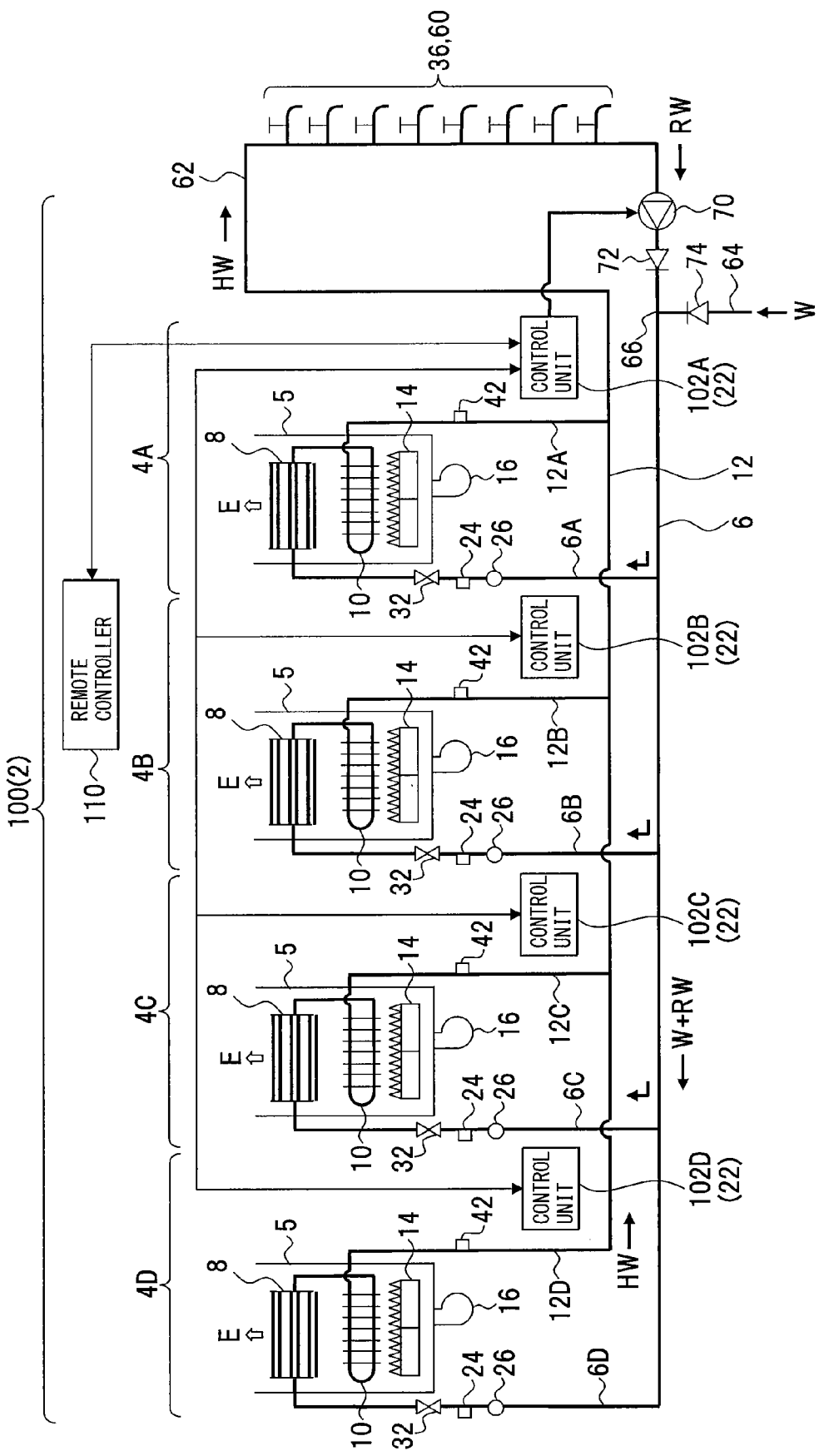
FIG. 5 depicts an example of structure of a water heater according to a second embodiment.

The second embodiment will be described with reference to FIG. 5. FIG. 5 depicts an example of structure of a water heater according to the second embodiment. The structure depicted in FIG. 5 is an example, and the present invention is not limited to such a structure. In FIG. 5, the same components as those in FIGS. 1 and 2 are denoted by the same reference numerals.

This water heater 100 is an example of a water heater of the present invention. In the water heater 100, for example, a plurality of equivalent combustion devices 4A to 4D are disposed in parallel. The devices use water supply pipe 6 and hot water outgoing pipe 12 commonly to supply hot water HW to a hot water supply part. In the water heater 100, as described above, the combustion devices 4A to 4D, the water supply pipe 6 and the hot water outgoing pipe 12 cycles via a circulation line 62 disposed in the hot water supply part, and heat of hot water circulated therethrough is kept.

The combustion devices 4A to 4D provide control units 102A to 102D, respectively, for performing combustion control in each device. In the water heater 100, for example, the combustion device 4A is set as a priority device (mother device). The control unit 102A performs control of supplied hot water temperature for the flow rate of supplied water flowing all over the water heater 100 and control of the operation of a circulation pump 70 executed by linking the above control of supplied hot water temperature. The control units 102B to 102D of the combustion devices 4B to 4D, which are set as child devices, are connected to the control unit 102A, and perform water heating control for the common water supply pipe 6 and the hot water outgoing pipe 12 by linking the control unit 102A.

In the water heating control and thermal control in the water heater 100, the same control commands maybe issued for all the combustion device 4A to 4D from the control unit 102A of a priority device. Alternatively, a common command on outgoing hot water temperature may be issued from the control unit 102A and combustion control in each combustion device 4A to 4D based on incoming water temperature and outgoing hot water temperature may be performed by each control unit 102A to 102D.

The water heater 100 provides, for example, a remote controller 110 as an input device so that a user can set required temperature of supplied hot water. The remote controller 110 is connected to, for example, the control unit 102A of the combustion device 4A that is a priority device by wire or wirelessly, and accepts an input of temperature setting to the water heater 100.

The determination of a priority device may be set in the water heater 100 in advance, or, may be set by a user. Among the combustion devices 4A to 4D, a priority device may be altered based on a predetermined condition. A connection destination of the remote controller 100 is not limited to a priority device. All the combustion devices 4A to 4D in the water heater 100 may be connected thereto.

In each combustion device 4A to 4D depicted in FIG. 5, bypass means from the water supply pipe 6 to the hot water outgoing pipe 12 as depicted in FIGS. 1 and 2 is omitted. Thus, control of outgoing hot water and control of the flow rate of outgoing hot water using the bypass valve 28 maybe performed as described above. Other components in the water heater 100 different from the above described combustion device 4 and water heater 2 are not limited to the structure depicted in FIG. 5, and the same structure as depicted in FIGS. 1 and 2 may be applied.

Figure 6:
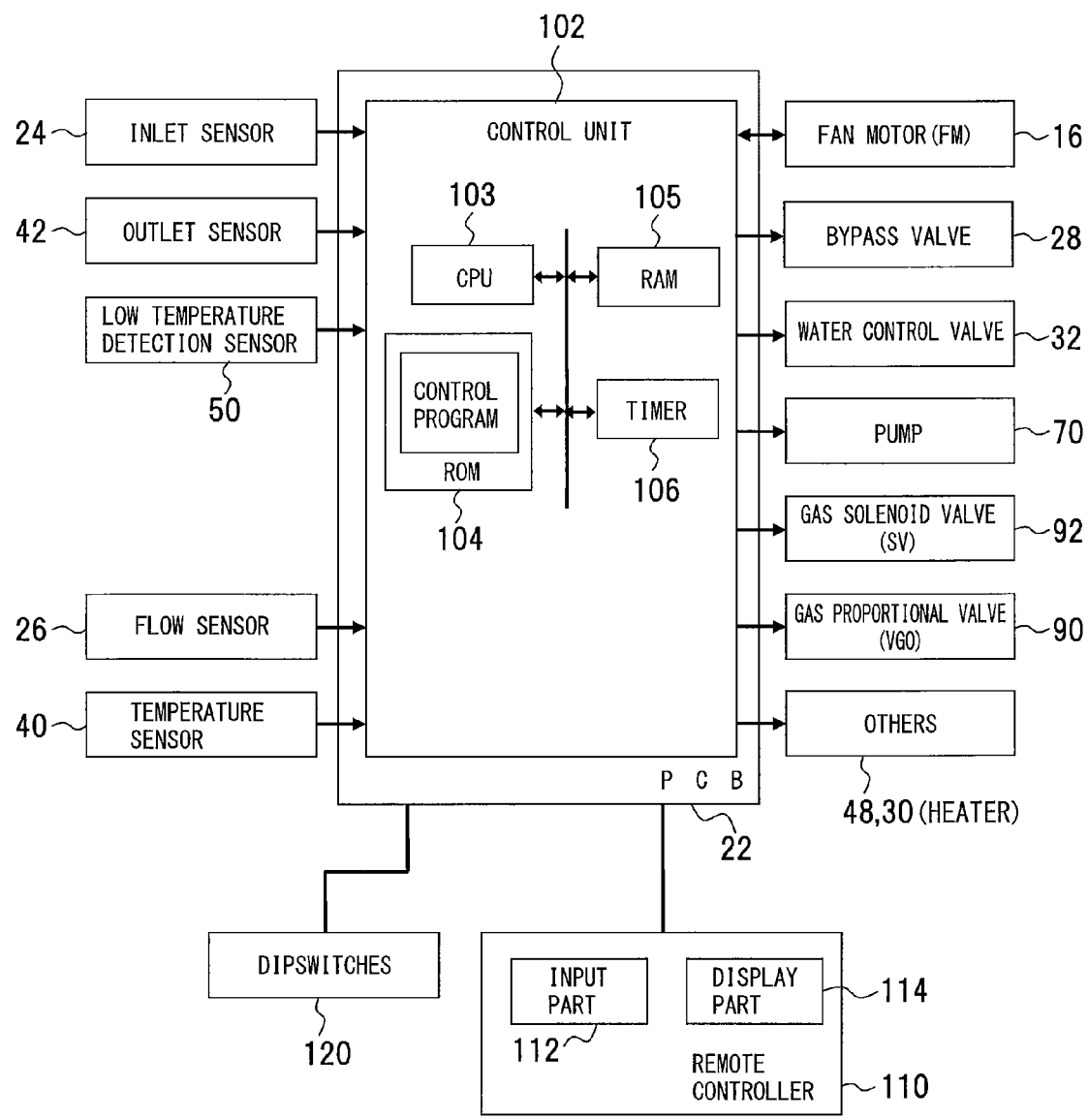
FIG. 6 depicts an example of structure of hardware in a control unit of a combustion device.
Figure 7A:
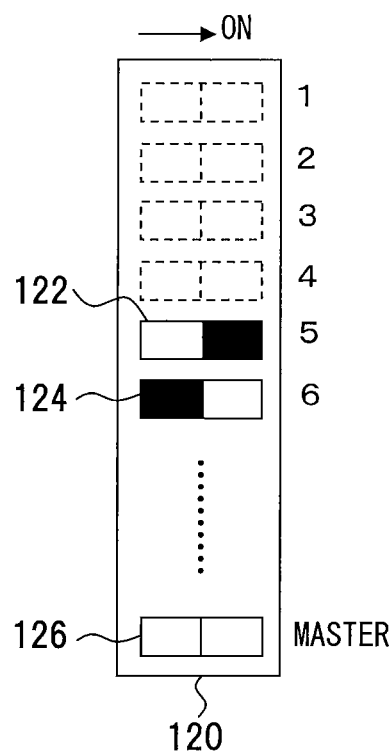
FIGS. 7A and 7B depict examples of structure of dipswitches.
Figure 7B:
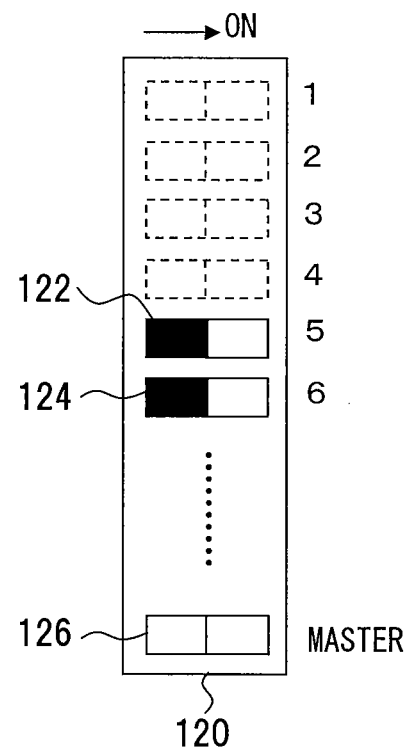

An example of structure of the control unit of the combustion device will be described with reference to FIGS. 6 to 7B. FIG. 6 depicts an example of structure of hardware in the control unit of the combustion device, and FIGS. 7A and 7B depict examples of structure of dipswitches. Each structure depicted in FIGS. 6 to 7B is an example, and the present invention is not limited to such a structure.

The control unit 102 of the combustion device 4 may be composed by using a microcomputer, and the above described PCB 22 may be used therefor. The control unit 102 is composed of, for example, an input circuit taking in detection information from each sensor disposed in the water heater 100, calculation means executing various calculations, storage means storing a control program, etc. and output means outputting a control signal. The control unit 102 includes, for example, a CPU (Central Processing Unit) 103, a ROM (Read-Only Memory) 104, a RAM (Random-Access Memory) 105 and a timer 106.

The CPU 103 is an example of calculation means, and executes a control program in the ROM 104 to output a control command based on combustion control, detected temperature, detected flow rate, etc.

The ROM 104 is an example of storage means, and stores control programs on, for example, water heating control, combustion control for a burner 14, a fan motor 16 and a gas adjustment valve 20, and thermal control of the water heater 100. The ROM 104 also stores a control program for performing circulation control for a circulation pump 70 or water heating control for the whole of the water heater 100 if the control unit 102 is used as a control unit of a priority device.

The ROM 104, which stores these control programs, may be composed of EEPROM (Electrically Erasable and Programmable Read Only Memory) that is rewritable electrically.

Control programs, etc. are not limited to what stored in the ROM 104, etc. Control programs stored in a computer-readable recording medium such as a magnetic disk, a flexible disk, an optical disk and a magneto-optical disc may be used.

The RAM 105 composes a work area for executing the above control programs, etc.

The timer 106 is an example of timekeeping means and obtains combustion time of the burner 14 and operational time of the circulation pump 70 or time information such as operation stop time and elapsed time.

Information on supplied water temperature and outgoing hot water temperature are inputted from a water temperature sensor 24 and a hot water temperature sensor 42 to the control unit 102 as detection information. Flow rate information is also inputted thereto from a flow rate sensor 26. Further, temperature information etc. are inputted from a temperature sensor 40 and a low temperature detection sensor 50, and rotating speed information etc. are inputted from the fan motor 16. Flame detection information such as information whether there is FR current or not from a flame rod and information on measured current value maybe inputted as other inputs.

Control information based on the input information is outputted to the fan motor 16, the bypass valve 28, a water control valve 32, the circulation pump 70, a gas proportional valve 90 and a gas solenoid valve 92. The control information is also outputted to an igniter 48, a heater 30 and informing means such as a speaker and a buzzer in an indicator, and a display part, as other outputs.

The remote controller 110, dipswitches 120, etc. are connected to the control unit 102. The remote controller 110 includes, for example, an input part 112 as input means for being controlled by a user as well as a power switch and an operation start switch. A display part 114 may be included as information display means for displaying an operation state of the water heater 100 and a combustion state of each combustion device 4A to 4D.

The dipswitches 120 are examples of setting means for an electronic circuit of a PCB 22. The dipswitches 120 are disposed in each control unit 102A to 102D, and are used for, for example, performing setting of recognition of a priority device and performing setting of an operation control mode for the circulation pump 70.

The dipswitches 120 can be set in a circulation mode (FIG. 7A) or a normal operation mode (FIG. 7B) as an operation control mode of the circulation pump 70. The circulation mode may be used in freezing monitoring and freezing prevention of water in the circulation line 62. When temperature of the hot water HW flowing in the circulation line 62 becomes a predetermined value or therebelow, the circulation pump 70 is operated. In the circulation mode, a circulation setting switch 122 is turned ON as depicted in FIG. 7A, and a switch 124 is turned OFF. In the dipswitches 120, a plurality of switches are set for setting of the circulation mode. The invention is not limited thereto. Setting may be performed only by the circulation setting switch 122.

The normal operation mode is setting that only the circulation pump 70 is operated by linking, for example, water heating operation. The circulation setting switch 122 and the switch 124 may be set being "OFF" as depicted in FIG. 7B.

The dipswitches 120 include a setting switch 126 for setting a priority device (Master) and a dependent device (Slave). Therefore, the association among the combustion devices can be set by executing a setting process for the control units 102A to 102D of the combustion devices 4A to 4D, respectively. In the dipswitches 120, kinds of supplied fuel gas may also be set.

Figure 8:
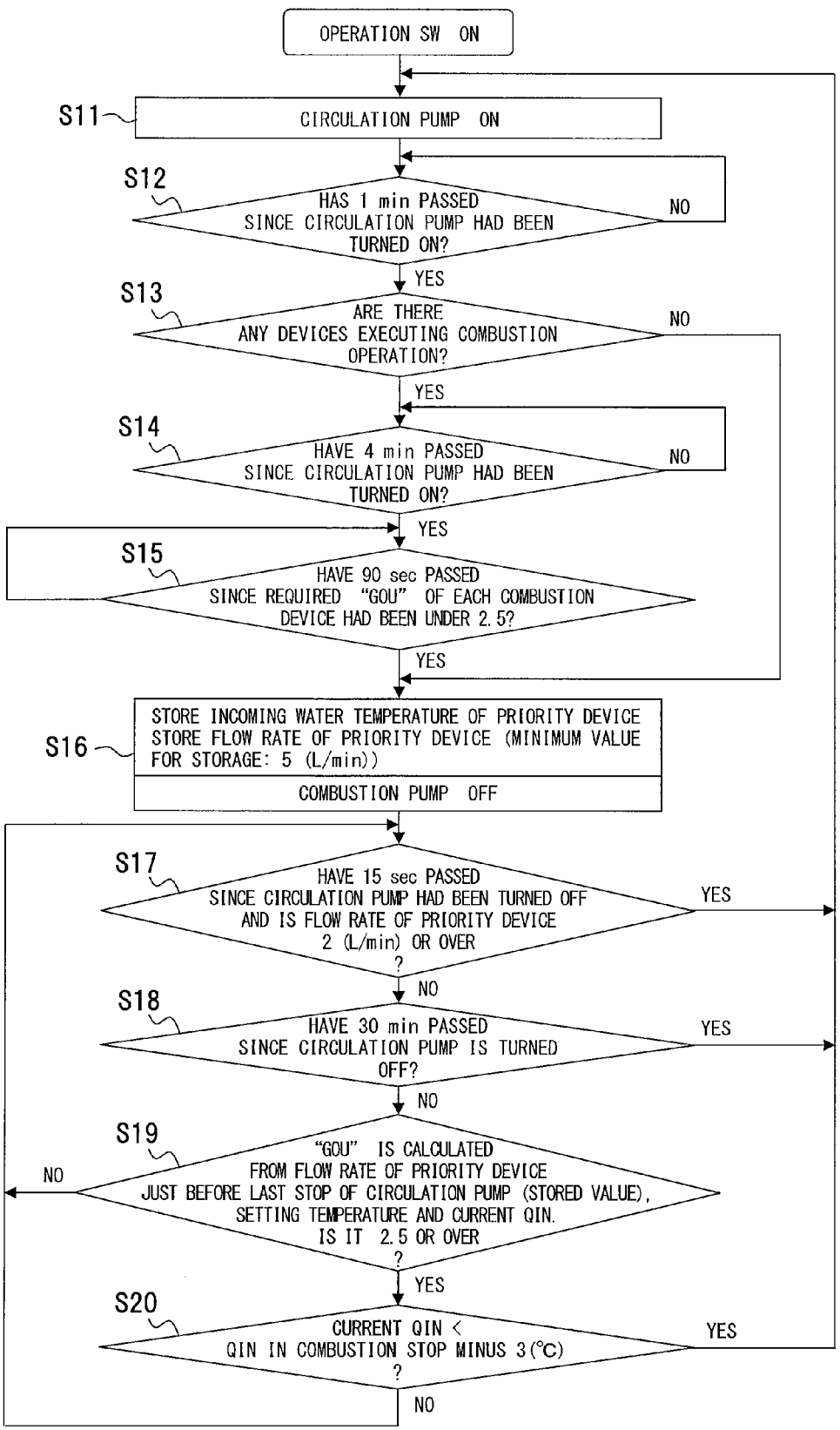
FIG. 8 is a flowchart depicting an example of thermal circulation operation control.
Figure 9:
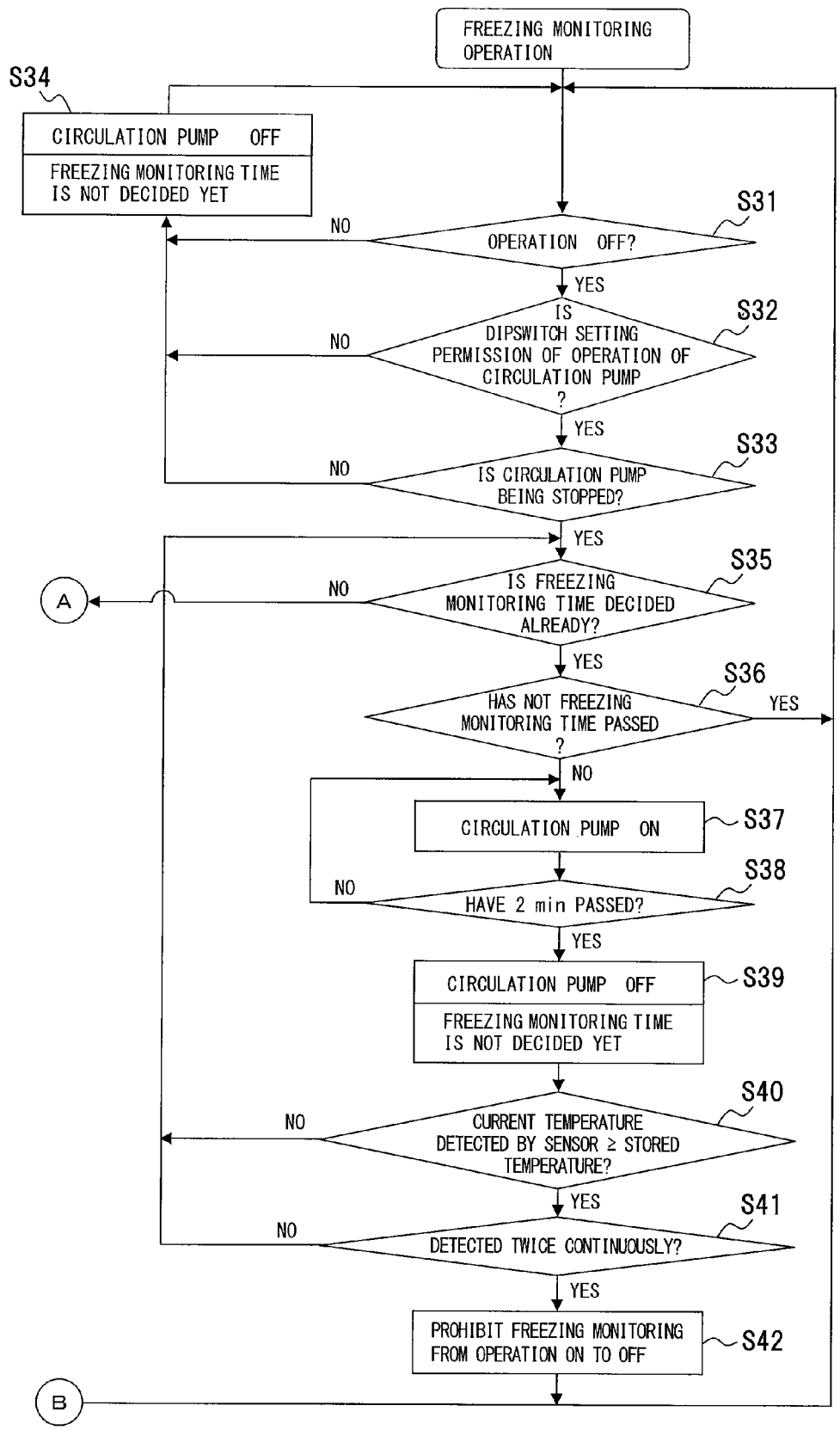
FIG. 9 is a flowchart depicting an example of freezing monitoring operation control.
Figure 10:
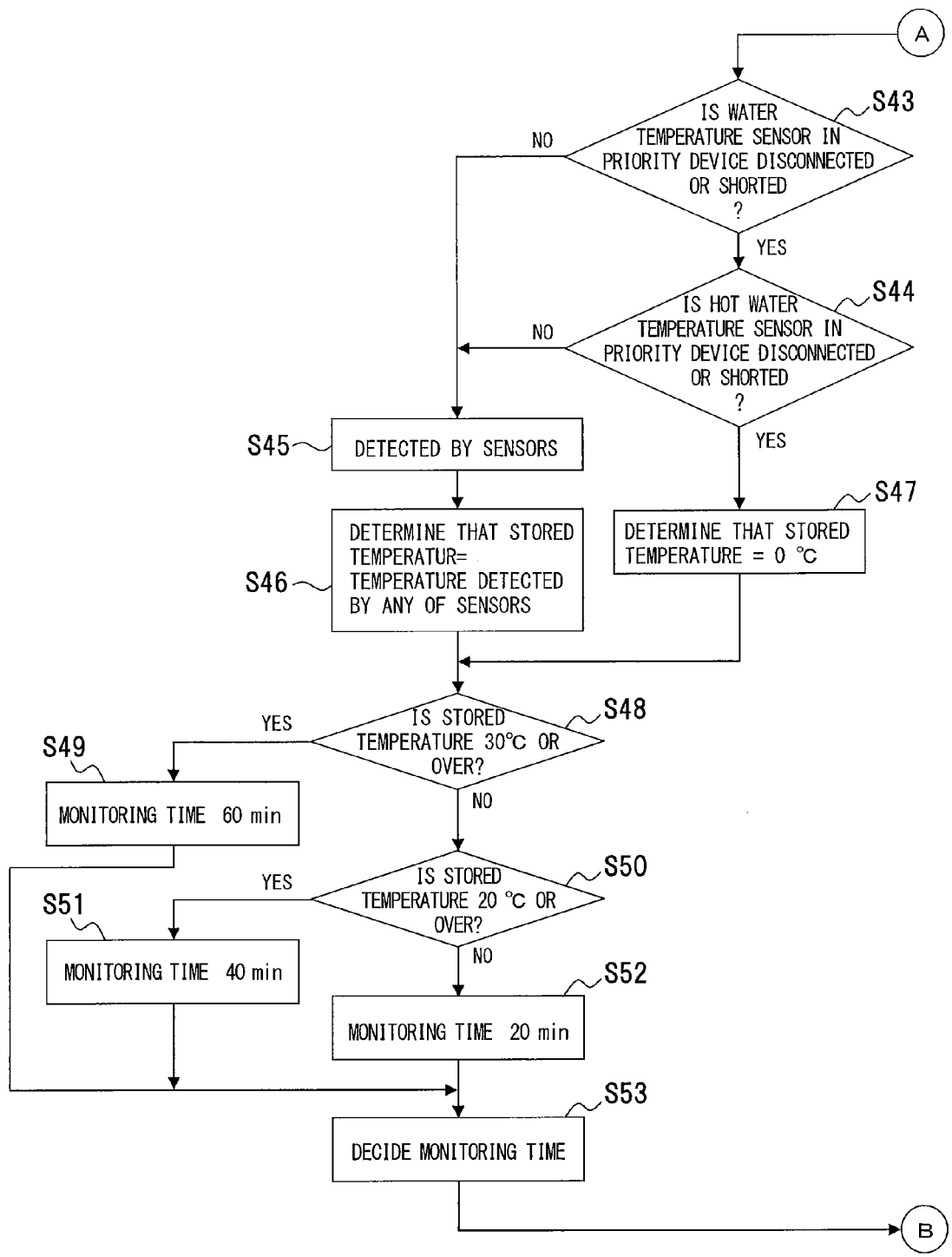
FIG. 10 is a flowchart depicting an example of the freezing monitoring operation control.
Figure 11:
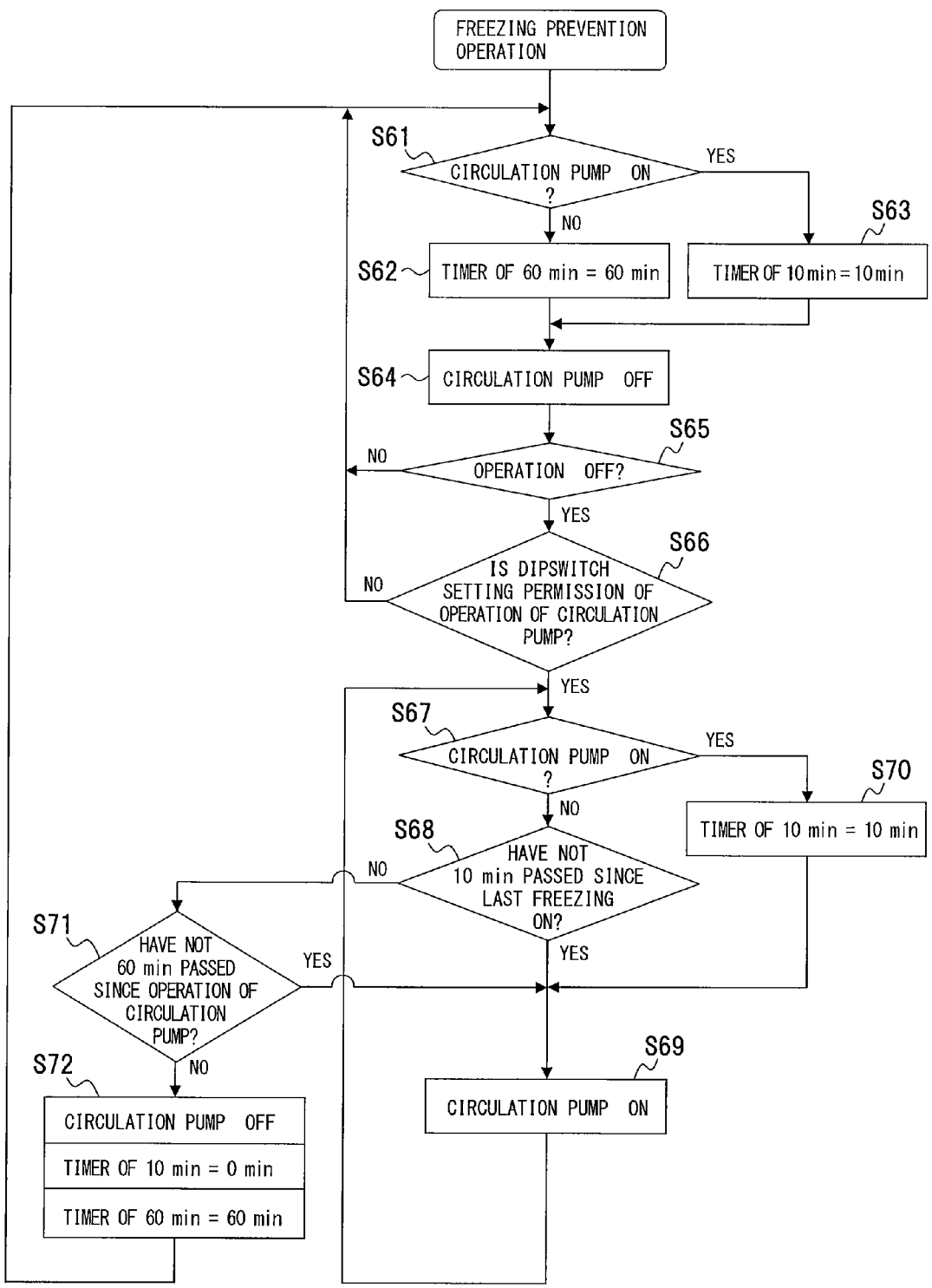
FIG. 11 is a flowchart depicting an example of freezing prevention operation control.
Figure 12:
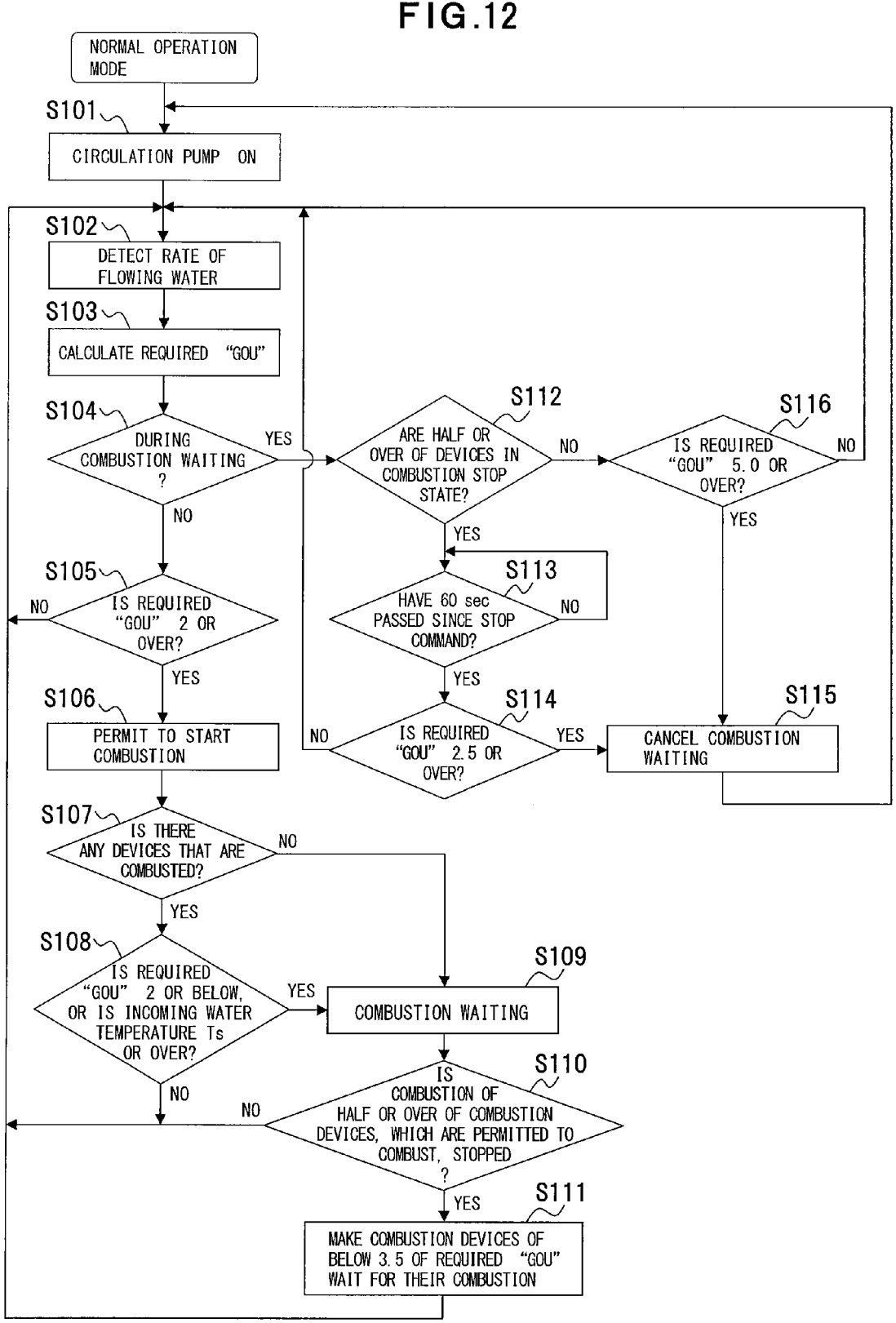
FIG. 12 is a flowchart depicting an example of normal operation control.

Operation control of the water heater will be described with reference to FIGS. 8 to 12. FIG. 8 is a flowchart depicting an example of thermal circulation operation control, FIGS. 9 and 10 are a flowchart depicting an example of freezing monitoring operation control, FIG. 11 is a flowchart depicting an example of freezing prevention operation control, and FIG. 12 is a flowchart depicting an example of normal operation control. Processing procedure and processing contents depicted in FIGS. 8 to 12 are examples, and the invention is not limited thereto. A and B, depicted in FIGS. 9 and 10, are connectors.

(a) Thermal Circulation Operation Control (FIG. 8)

In thermal circulation operation control, for example, required "gou" is calculated from supplied water temperature, the flow rate and outgoing hot water temperature. When the required "gou" is a predetermined value or over, the circulation pump 70 is operated and the burner 14 is combusted. When the required "gou" does not reach a predetermined value, combustion is stopped.

When a driving switch of the remote controller 110 is turned on as depicted in FIG. 8, an ON command is issued to the circulation pump 70 and pump circulation operation is started (step S11). The operation of the circulation pump 70 is kept till a predetermined time h1, for example, one minute has passed (step S12). Thereby, every part of the hot water HW in the circulation line 62 can be the same temperature. After the predetermined time h1 has passed (YES of step S12), it is confirmed whether there is any of the combustion devices 4 executing combustion operation in the water heater 100 (step S13).

If there is any of the combustion devices 4 executing combustion operation (YES of step S13), the combustion operation is kept till a predetermined time h2, for example, 4 minutes have passed since the start of the operation of the circulation pump 70 (step S14). After the predetermined time h2 has passed, it is determined whether a predetermined time h3, for example, 90 seconds have passed or not since required "gou" of each combustion device 4 had been under a predetermined value x1, for example, 2.5 (step S15). The predetermined value x1 of the required "gou" is, for example, the minimum operation capability of the combustion device 4, and means that the difference between setting temperature Ts and return temperature of the circulated hot water HW is a little.

In the water heater 100, setting return temperature Tsp when the required "gou" is 2.5 maybe calculated as follows:

$$Tsp = Ts - (2.5\,(gou) \times 25)/(Wb/Nwh) - 1\ (^\circ C.) \quad (3)$$

In this formula (3), Ts represents setting temperature and Nwh represents the number of combustion devices which can be combusted in the flow rate of circulated return water Wb. According to the above, when the required "gou", calculated from the flow rate of circulated water, return temperature and setting temperature, is under 2.5, the combustion device 4 does not make the burner 14 combust even if water flows. Thus, the setting return temperature Tsp calculated from the formula (3) is set as an operation stop condition of the circulation pump 70. That is, it is meant that when the setting return temperature Tsp is high and the hot water HW is well heated, further heating is not needed.

When the predetermined time h3 has passed since the required "gou" is under the predetermine value x1 (YES of step S15), it is judged that the hot water HW of setting temperature is circulated in the circulation line 62 and water heating is available, and thus, the circulation pump 70 is turned OFF (step S16). If there is no combustion device 4 executing combustion operation (NO of step S13), the circulation pump 70 is also stopped for saving electric consumption. When the circulation pump 70 is stopped, the combustion device 4A in the water heater 100, set as a priority device, stores incoming water temperature and the flow rate.

It is determined after a predetermined time h4, for example, 15 seconds have passed since the circulation pump 70 had been stopped whether the flow rate of the priority device is a predetermined rate Q1, for example, 2 (L/min) or over, or not (step S17). In the determination, if the flow rate is the predetermined rate Q1 or over after the predetermined time h4 has passed, the process returns to the above step S11 because, for example, there is demand for water heating.

In the determination of step S17, when the flaw rate is below the predetermined rate Q1 (NO of step S17), the process returns to step S11 if a predetermined time h5, for example, 30 minutes have passed since the circulation pump 70 had been stopped, and the circulation pump 70 is started to operate.

If the predetermined time h5 has not passed since the circulation pump 70 had been stopped (NO of step S18), it is determined whether required "gou" is a predetermined value x2, for example, 2.5 or over, or not (step S19). This required "gou" is calculated from the stored circulation rate of the circulation pump 70, setting temperature and the current return temperature QIN. If the required "gou" is the predetermined value x2 or over, and the current return temperature QIN is lower than the return temperature QIN when the circulation pump 70 is stopped and combustion is stopped by 3 (° C.) or over (YES of step S20), the process returns to step S11 and thermal circulation is executed.

(b) Freezing Monitoring Operation Control (FIGS. 9 and 10)

This freezing monitoring operation control represents a process for monitoring whether freezing prevention is necessary or not for the circulation line 62 etc. For example, when water is not circulated in the circulation line 62, it is difficult to detect return temperature by the water temperature sensor 24. The difference in temperature is easy to arise among the water supply pipe 6, the hot water outgoing pipe 12 and the circulation line 62 because of, for example, the difference in the way to arrange them so that it is difficult to set a correct standard as to performing freezing prevention. Thus, the circulation pump 70 is operated periodically, and it is monitored whether to be temperature necessary for freezing prevention.

Whether operation is set being OFF is determined for the water heater 100 as depicted in FIG. 9 (step S31). When the operation setting is OFF (YES of step S31), freezing monitoring is performed. The reason for the above is that, for example, while the operation switch of the remote controller 110 is turned ON, the possibility of being frozen is low because circulation heating is executed so as to be setting temperature, and thus, it is probably vain to perform freezing monitoring using the circulation pump 70 in this situation.

Freezing monitoring conditions are defined as follows: an operation switch is OFF (YES of step S31) and the dipswitches 120 of the control unit 102 are set in, for example, a circulation mode as permission of pump circulation (YES of step S32). When the circulation pump 70 is being stopped (YES of step S33), the freezing monitoring operation is started. When these conditions are not met, the circulation pump 70 is stopped (step S34). In this case, freezing monitoring time is not decided yet.

In the freezing monitoring operation, whether freezing monitoring time is decided is determined (step S35). If the freezing monitoring time is decided already (YES of step S35), the operation of the circulation pump 70 is waited till the decided setting time (step S36). After moving to the freezing monitoring operation, the circulation pump 70 is operated for a predetermined time h6, for example, 2 minutes (steps S37 and S38). After the predetermined time h6 has passed (YES of step S38), the circulation pump 70 is stopped (step S39). In this case, the freezing monitoring time is not decided yet, neither. Then, it is determined whether current temperature detected by a sensor is the stored temperature or over (Step S40). If it is detected twice (YES of step S41) that the current temperature detected by a sensor is higher than the stored temperature (YES of step S40), it is determined that water temperature is raised, the operation is once turned ON, and the freezing monitoring is prohibited till the operation is turned OFF again (step S42).

When the freezing monitoring time is not decided (NO of step S35), it is checked whether the water temperature sensor 24 and the hot water temperature sensor 42 are normal as to a priority device (steps S43 and S44). If the temperature sensors are normal (NO of steps 43 or 44), it is performed to detect temperature of supplied water and/or circulated water by temperature sensors (step S45), and detected value is treated as stored temperature (step S46). If the water temperature sensor 24 and the hot water temperature sensor 42 have anomaly (YES of steps S43 and S44), the stored temperature is set to 0 (° C.) (step S47).

When the stored temperature is a predetermined temperature T1, for example, 30 (° C.) or over (YES of step S48), monitoring time is set to a predetermined time h7, for example, 60 minutes (step S49). When the stored temperature is below the predetermined temperature T1 (NO of step S48) and is a predetermined temperature T2, for example, 20 (° C.) or over (YES of step S50), the monitoring time is set to a predetermined time h8, for example, 40 minutes (step S51). When the stored temperature is lower than the predetermine temperature T2 (NO of step S50), the monitoring time is set to a predetermined time h9, for example, 20 minutes (step S52). In this setting of the monitoring time, long monitoring time is taken when detected temperature is high and short monitoring time is taken when the detected temperature is low. In this time setting, short monitoring time is taken when the current temperature is low because time for reaching temperature to prevent freezing becomes short.

After the monitoring time is decided by this setting process (step S53), the process returns to step S31 and the freezing monitoring is performed.

The freezing monitoring operation control may be performed repeatedly, and may be performed simultaneously with the above described thermal circulation operation control.

(c) Freezing Prevention Operation Control (FIG. 11)

In the freezing prevention operation, control is performed using the monitoring time of the circulation pump 70 decided in the freezing monitoring operation, based on temperature detected by the water temperature sensor 24 or by the hot water temperature sensor 42 of the combustion device 4A set as a priority device.

The operation of the circulation pump 70 is monitored as depicted in FIG. 11 (step S61). When the circulation pump 70 is stopped (NO of step S61), time of 60 minutes is set in the timer 106 (step S62). When the circulation pump 70 is ON (YES of step S61), time of 10 minutes is set in the timer 106 (step S63). The circulation pump 70 is stopped (Step S64), and it is confirmed whether the operation switch of the water heater 100 is OFF in, for example, the remote controller 110 (YES of step S65). It is also confirmed whether the dipswitches 120 are set in the operation permission state for the circulation pump 70 (step S66). In this confirmation, it is confirmed, for example, whether the dipswitches 120 are set in the circulation mode (FIG. 7A) for the circulation pump 70.

In an execution process of the freezing prevention operation, whether the circulation pump 70 is operated or not is determined (step S67). If the operation thereof is stopped (NO of step S67), it is confirmed whether, for example, 10 minutes have not passed since the last freezing prevention operation of the circulation pump 70 with reference to recording data in the storage means such as the ROM 104 (step S68). If 10 minutes have not passed since the last freezing prevention operation of the circulation pump 70 (YES of step S68), the circulation pump 70 is operated (step S69).

When the circulation pump 70 is being operated (YES of step S67), the circulation pump 70 is kept operating until 10 minutes have passed with reference to timekeeping of the timer 106 (step S70).

If 10 minutes or over have passed since the last freezing prevention operation of the circulation pump 70 (NO of step S68), it is determined whether 60 minutes have not passed since the operation of the circulation pump 70 (step S71). If 60 minutes have not passed (YES of step S71), the driving of the circulation pump 70 is continued (step S69). If 60 minutes or over have passed (NO of step S71), the circulation pump 70 is turned OFF, time of 60 minutes is set in the timer 106 (step S72) and the process returns to step S61.

(d) Normal Operation Mode (FIG. 12)

An example of a normal operation of the water heater 100 will be represented below. In this normal operation mode, combustion is stopped when the hot water HW in the circulation line 62 reaches setting temperature and required "gou" for each combustion device 4A to 4D becomes the minimum by combustion control. Combustion operation is restarted when the required "gou" changes due to, for example, the use of the hot water HW at the hot water supply part.

When the circulation pump 70 is turned ON as depicted in FIG. 12 (step S101), the rate of flowing water is detected by the flow rate sensor 26 (Step S102). Required "gou" is calculated using setting temperature for the water heater 100, the detected flow rate and supplied water temperature (step S103). The required "Gou" is obtained by calculating the required combustion heat quantity from the difference between the supplied water temperature and the set temperature, and the flow rate using the above described formula (1).

It is determined whether combustion waiting is set (step S104). If during combustion (NO of step S104), permission to start combustion is outputted to each combustion device 4A to 4D (step S106) when the required "gou" is, for example, 2 or over (YES of step S105).

The combustion is stopped at the time point when the required "gou" becomes 2 or below, or incoming water temperature becomes the setting temperature Ts or over (YES of step S108) if there is any device which operates combustion (YES of step S107) for the permission to start combustion. The combustion is also stopped when there is no device which starts the combustion operation (NO of step S107). After the combustion is stopped, combustion waiting is set (step S109).

When combustion of half or over of the combustion devices 4A to 4D disposed in the water heater 100, which are permitted to combust, are stopped (YES of step S110), a combustion devices of below 3.5 of the required "gou" may be allowed to wait for their combustion (step S111).

As to a cancel process of the combustion waiting about the combustion devices 4A to 4D, in combustion waiting (YES of step S104), it is determined whether half or over thereof are in a combustion stop state (step S112). If half or over thereof are in the combustion stop state (YES of step S112), the combustion waiting is cancelled (step S115) when, for example, 60 seconds have passed since a stop command (YES of step S113) and when the required "gou" is, for example, 2.5 or over (YES of step S114), and the process returns to step S101.

When half or over thereof are not in the combustion stop state (NO of step S112) and the required "gou" is, for example, 5.0 or over (YES of step S116), the combustion waiting is cancelled (step S115), and the process returns to step S101. When the required "gou" is not 2.5 or over (NO of step S114) and is not 5.0 or over (NO of step S116), the process returns to step S102.

According to such structure, operation of a water heater, including a circulation pump for circulating heated hot water can be controlled by a control unit common to, for example, a combustion part. Thus, structure of a control unit can be simplified. Operation control of a circulation pump etc. is linked with combustion control of a combustion part in water heating operation, thermal operation, monitoring for protection against freezing, etc. Thus, a common control unit can be used, and structure of the water heater can be simplified. The improvement of the operability for the control unit can also be achieved. The efficiency of thermal control can be achieved by linking operation control of a combustion part and a circulation pump according to setting temperature. Running costs can also be saved. A heat pump, a circulation pipe, etc. can be prevented from being frozen by a simple control structure, and damage to a device, etc. can also be prevented.

EXAMPLES

Figure 13:
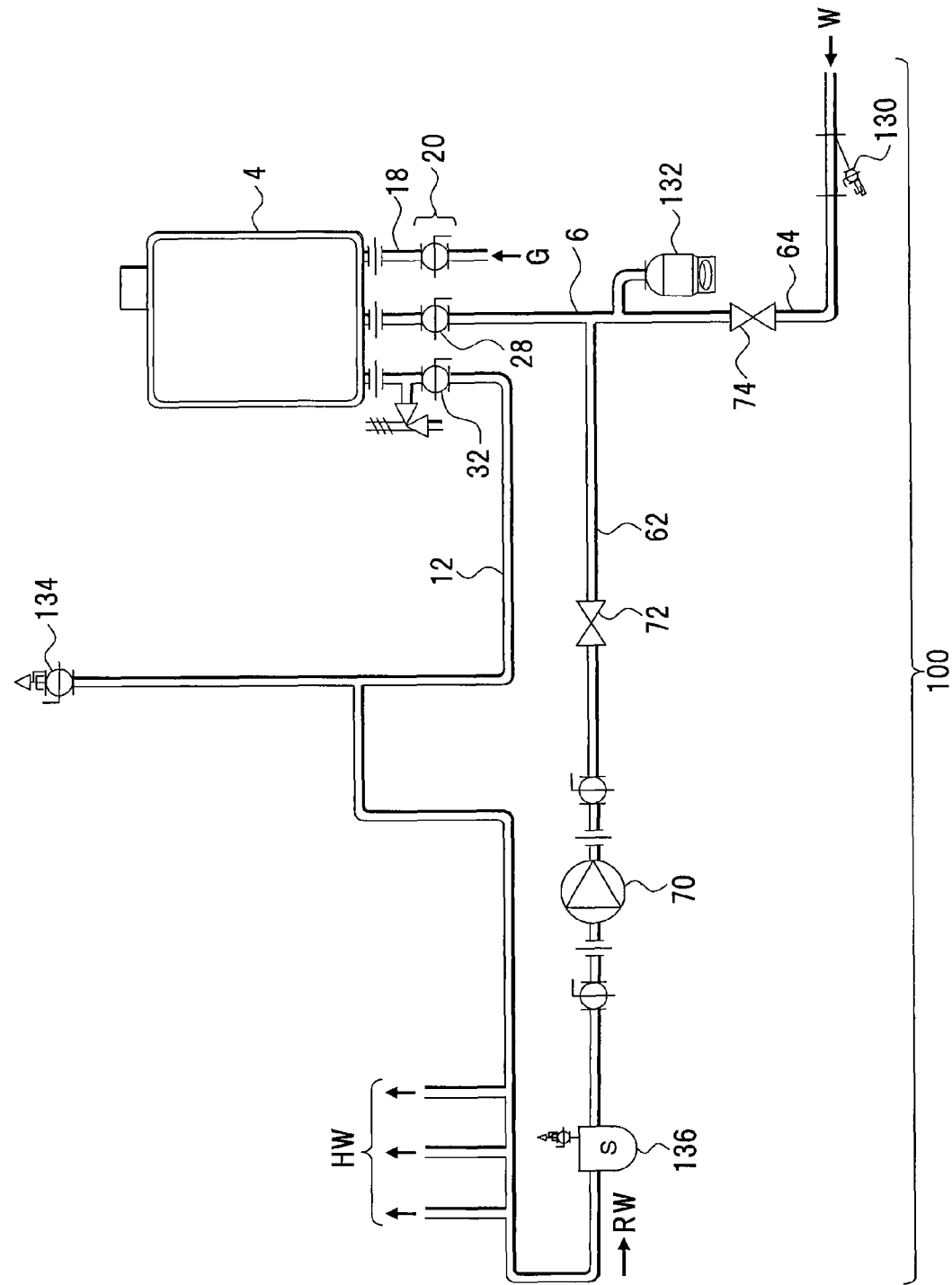
FIG. 13 depicts an example of a water heater.

An example of a water heater will be described with reference to FIG. 13. FIG. 13 depicts an example of a water heater.

In this water heater 100, the tap water pipe 64 are joined to the circulation line 62, and the tap water W of lower temperature and the return water RW of higher temperature are supplied to the combustion device 4. A Y shaped strainer 130 is provided in the tap water pipe 64 as an example of water straining means. An expansion tank 132 storing the tap water W and the return water RW may be provided in the water supply pipe 6. An air vent 134 is provided for discharging the air in the heated hot water HW for the hot water supply part on the hot water outgoing pipe 12.

An air separator 136 is disposed in front of the circulation pump 70 on the circulation line 62.

Features and advantages of the water heater and control method therefor of the present invention described above are as follows.

(1) In the present invention, the circulation pump 70, the check valves 72 and 74, and the branch 66 are disposed in the circulation line 62 between the combustion device 4 and the hot water outlet 36, the circulation pump 70 is stopped and operated according to circulated water temperature, and thermal control is performed as to the circulated water.

(2) According to the present invention, temperature on pipes can be detected, in which the circulation pump is disposed and hot water is circulated, with the simple control unit, and thus, heating can be stopped when the detected temperature is certain level or over. Thereby, a circulation pump is not operated continuously, and the tolerance of a water heating circuit can be maintained.

(3) An instantaneous water heating unit including a tank, an electric heater, a temperature detector and controller that controls them is required to be disposed in a water heater so as to supply boiled hot water instantaneously when needed. The unit is complex and expensive. However, according to the water heater of the present invention, hot water can be supplied instantaneously with simple structure.

(4) According to the water heater of the present invention, freezing prevention and freezing monitoring can be executed by linking the control unit of the combustion device. Thus, the control unit can be simplified.

(5) The water heater includes, for example, the combustion device 4, branch furniture that divides an incoming water path connected to the combustion device 4, a return path from a branch path to a faucet, a check valve and circulation pump disposed in the middle of the return path and an outgoing hot water path from the water heater to the faucet (outgoing path).

(6) A connection terminal of a signal line for turning the circulation pump on/off is included in the control unit of the water heater. A program for allowing execution of ON/OFF control of the circulation pump by connecting the signal line of the circulation pump is also included therein.

(7) The water heater includes a program for allowing disposing a plurality of combustion devices with low costs using functional components included in the combustion device 4.

(8) The water heater of the present invention includes setting that a mode is switched to a freezing prevention mode by turning a driving switch OFF.

(9) This water heater easily becomes a low-cost instantaneous device by providing the circulation pump and the check valve in the circulation line.

(10) Operation control of the circulation pump can be performed just by connecting a power source line of the circulation pump to a water heating device.

(11) Running costs can be saved since heat is kept efficiently according to thermal control depending on setting temperature.

(12) The tolerance is improved by efficient operation of the circulation pump according to thermal control depending on setting temperature.

(13) A simple method can prevent the water heater and the circulation line from being frozen and damaged.

(14) This water heater includes, for example, a water heating device in which water temperature or outside air temperature can be detected, water supply and hot water supply pipes, a pump that makes hot water circulate in a circuit thereof, and if needed, a hot water tank for storing hot water. A circulation pump to control the circuit for heating water in the pipes optimally is controlled by linking the water heating device.

(15) In this water heater, a terminal and function for controlling a circulation pump is provided on a substrate, and if a detection part of return water temperature in the water heating device determines that the temperature in the pipes reaches setting temperature already, a main terminal is turned OFF, the circulation pump is stopped, and the combustion of the water heating device is stopped. If the detection part of return water temperature determines that the water temperature in the pipes lowers and the water in the pipes must be heated, the main terminal is turned ON, the circulation pump is booted, and the combustion of the water heating device is started.

(16) In this water heater, it is determined that pipes can be frozen when disposed temperature detection means detects a certain temperature or below, and the main terminal on the substrate is turned ON. The circulation pump connected to the terminal is also turned ON. Start of the circulation of the water in the pipes prevents the water in the pipes from being frozen.

While the most preferred embodiments have been described hereinabove, the present invention is not limited to the above description, and it is a matter of course that various variations and modifications can be made by those skilled in the art within the scope of the claims without departing from the spirit of the invention disclosed herein, and needless to say, such variations and modifications are also encompassed in the scope of the present invention.

What is claimed is:

1. A water heater comprising:
   one or a plurality of heat exchangers that heat tap water or return water with combustion heat generated by combustion of a burner, the return water being from a hot water supply part;
   a circulation line that supplies the tap water or the return water, which is heated by the heat exchangers, to the hot water supply part, and circulates the return water from the hot water supply part through the heat exchangers;
   an incoming water pipe that joins the circulation line between the hot water supply part and the heat exchangers, and supplies the tap water to the circulation line;
   a circulation pump that circulates the return water through the circulation line; and
   a control unit that links the combustion of the burner to operation of the circulation pump, calculates a flow rate for supplying the hot water required for a thermal process after a predetermined time has passed since hot water supply had been ended by shut-off of an opening and shutting faucet that is set on the circulation line, starts the operation of the circulation pump and the combustion of the burner, the combustion corresponding to a quantity of heat for making the return water, which flows at the flow rate, a predetermined temperature, and stops the operation of the circulation pump and the combustion of the burner when a predetermined time of the thermal process has passed.

2. The water heater of claim 1, further comprising:
   a temperature sensor that detects temperature of the tap water and/or the return water at an inlet part of the heat exchangers; and
   a flow rate sensor that detects flow rates of the tap water and/or the return water for the heat exchangers in the circulation line,
   wherein the control unit calculates required quantity of heat based on an incoming flow rate for the heat exchangers and temperature detected by the temperature sensor, stops combustion of the heat exchangers based on the required quantity of heat, and stops the circulation pump.

3. The water heater of claim 1, wherein the control unit further causes the circulation pump to operate when the flow rate in the circulation line is a predetermined value or over or when the required quantity of heat of the tap water and/or the return water is a predetermined value or over, during the stop of the circulation pump.

4. The water heater of claim 1,
   wherein the circulation line includes
   a hot water supply pipe that supplies hot water from the heat exchangers to the hot water supply part;
   a return pipe that returns the return water from the hot water supply part to the heat exchangers; and
   a branch that joins the incoming water pipe to the return pipe, and makes the tap water join the return pipe, and
   wherein the circulation pump is disposed on the return pipe.

5. The water heater of claim 4, wherein a check valve that prevents a back flow of the tap water or the return water is provided on the incoming water pipe and the return pipe.

6. The water heater of claim 1, wherein the control unit causes the circulation pump to move to freezing prevention operation when hot water temperature in the circulation line is predetermined value or below.

7. The water heater of claim 6, wherein the control unit includes a control switch for controlling operation for the circulation pump, and causes the circulation pump to execute the freezing prevention operation according to setting of the control switch.

8. A water heating control method, comprising:
   heating tap water or return water by one or a plurality of heat exchangers with combustion heat generated by combustion of a burner, the return water being from a hot water supply part;
   supplying the tap water or the return water, which is heated by the heat exchangers, to the hot water supply part, and circulating the return water from the hot water supply part through the heat exchangers via a circulation line by a circulation pump;
   supplying the tap water to the circulation line by joining the tap water to the circulation line between the hot water supply part and the heat exchangers; and
   linking the combustion of the burner to operation of the circulation pump, calculating a flow rate for supplying the hot water required for a thermal process after a predetermined time has passed since hot water supply had been ended by shut-off of an opening and shutting faucet that is set on the circulation line, starting the operation of the circulation pump and the combustion of the burner, the combustion corresponding to a quantity of heat for making the return water, which flows at the flow rate, a predetermined temperature, and stopping the operation of the circulation pump and the combustion of the burner when a predetermined time of the thermal process has passed.

9. The water heating control method of claim 8, further comprising:
   detecting temperature of the tap water and/or the return water at an inlet part of the heat exchangers;
   detecting flow rates of the tap water and/or the return water for the heat exchangers in the circulation line; and
   calculating required quantity of heat based on an incoming flow rate for the heat exchangers and the detected temperature, stopping combustion of the heat exchangers based on the required quantity of heat, and stopping the circulation pump.

10. The water heating control method of claim 8, further comprising operating the circulation pump when the flow rate in the circulation line is a predetermined value or over or when the required quantity of heat of the tap water and/or the return water is a predetermined value or over, during the stop of the circulation pump.

11. The water heating control method of claim 8, further comprising moving the circulation pump to freezing prevention operation when hot water temperature in the circulation line is a predetermined value or below.

* * * * *